US012265154B2

(12) United States Patent
Radwan et al.

(10) Patent No.: US 12,265,154 B2
(45) Date of Patent: Apr. 1, 2025

(54) ASSISTING REVERSE DRIVING OF A COMBINATION

(71) Applicant: Valeo Schalter und Sensoren GmbH, Bietigheim-Bissingen (DE)

(72) Inventors: Mohamed Radwan, Cairo (EG); Ahmed Elagroudy, Cairo (EG)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 265 days.

(21) Appl. No.: 17/572,966

(22) Filed: Jan. 11, 2022

(65) Prior Publication Data

US 2022/0221580 A1    Jul. 14, 2022

(51) Int. Cl.
*G01S 15/08* (2006.01)
*B60Q 9/00* (2006.01)
*B60T 7/22* (2006.01)
*G06T 7/60* (2017.01)

(52) U.S. Cl.
CPC .............. *G01S 15/08* (2013.01); *B60Q 9/008* (2013.01); *B60T 7/22* (2013.01); *G06T 7/60* (2013.01); *B60T 2230/08* (2013.01); *B60T 2250/00* (2013.01); *G06T 2207/30252* (2013.01)

(58) Field of Classification Search
CPC ... G01S 15/08; B60W 2420/42; B60W 30/09; B60W 50/14
See application file for complete search history.

(56) References Cited

U.S. PATENT DOCUMENTS

| 2014/0277941 A1 | 9/2014 | Chiu et al. |
| 2017/0232893 A1* | 8/2017 | Ebner ............... B60D 1/62 340/431 |
| 2017/0297619 A1* | 10/2017 | Lavoie ............... B62D 15/024 |
| 2018/0043933 A1* | 2/2018 | Hu .................... B62D 13/06 |
| 2020/0017143 A1 | 1/2020 | Gali |

FOREIGN PATENT DOCUMENTS

| DE | 10 2012 006206 A1 | 10/2013 |
| DE | 102019115789 A1 | 12/2020 |
| WO | 2020/079092 A1 | 4/2020 |

OTHER PUBLICATIONS

Extended European Search Report in corresponding European Application No. 21151179.5, dated Jun. 30, 2021 (8 pages).
Office Action Issued in Corresponding European Application No. 21 151 179.5, dated Apr. 24, 2024. (6 Pages).

* cited by examiner

*Primary Examiner* — Tarek Elarabi
*Assistant Examiner* — Mahmoud M Kazimi
(74) *Attorney, Agent, or Firm* — Osha Bergman Watanabe & Burton LLP (57) ABSTRACT

According to a method for assisting reverse driving of a combination (1), an actual value for a hitch angle of the combination (1) is determined by a computing unit (6) depending on sensor data generated by a hitch angle sensor. A hitch length of a trailer (3), given by a distance between a trailer body (11) and a hitch (7) of a vehicle (2), is determined depending on environmental sensor data of the combination (1). A collision value for the hitch angle is determined by the computing unit (6) depending on the hitch length, and the safety measure is triggered by the computing unit (6) depending on the actual value and the collision value for the hitch angle.

14 Claims, 5 Drawing Sheets

ASSISTING REVERSE DRIVING OF A COMBINATION

The present invention is directed to a method for assisting reverse driving for a combination, a combination comprising a motor vehicle with a hitch and a trailer with a drawbar, which is rotatably attached to the hitch, wherein an actual value for a hitch angle of the combination is determined by a computing unit of the combination depending on sensor data generated by a hitch angle sensor system of the combination. The invention further relates to a corresponding driver assistance system, a motor vehicle, a combination, a computer program and a computer-readable storage medium.

Reverse driving or backing up a combination of a motor vehicle with an attached trailer, for example a caravan or a boat trailer, is a counter intuitive process and consequently may be rather difficult for beginners. Mistakes may often result in a collision of the vehicle with the trailer or at least in folding the two components of the combination together in a deadlock situation, which is also denoted as a jackknife situation. Jackknife situations may result in traffic jams and wasted time and may potentially cause damage or personal injury. It is noted that a jackknife situations does not necessarily require a physical contact between the motor vehicle and the trailer. However, in a jackknife situation, further backward motion will inevitably result in such physical contact.

Since different trailers may be attached to the same vehicle and since the geometrical properties may be different for each trailer, it is unfeasible to determine an accurate kinematic collision detection formula. Using ultrasonic sensors to detect a trailer collision before it happens may prove to be difficult and non-robust due to different trailer geometries as several trailer shapes may divert the ultrasonic waves away and prevent a reliable detection.

In document US 2017/0297619 A1 a target-based trailer backup collision mitigation method is presented. A controller processes sequential images of the trailer, selects a baseline image, and determines a collision angle based on a location of a specific target put on the trailer in the baseline image. The controller further controls the steering system of the vehicle to maintain a hitch angle below a lesser of a maximum controllable angle and the collision angle. In order to determine the collision angle, a specific calibration is carried out for the actual trailer based on the target attached to the trailer.

A drawback of this approach is that the calibration process must be repeated in case a different trailer is attached to the vehicle. Furthermore, it may be time consuming and cumbersome to attach specific targets to the trailer to be able to carry out the calibration.

It is therefore an object of the present invention to provide an improved concept for assisting reverse driving of a combination with a motor vehicle and a trailer, which allows to prevent collisions between the motor vehicle and the trailer and may be applied universally to different trailers with different geometries or outlines.

This object is achieved by the respective subject-matter of the independent claims. Further implementations and preferred embodiments are subject-matter of the dependent claims.

The improved concept is based on the idea to estimate a hitch length of the trailer given by a distance between a trailer body and the hitch of the motor vehicle by means of an environmental sensor system and determine a collision value for the hitch angle depending on the hitch length.

According to the improved concept, a method for assisting reverse driving of a combination is provided. The combination comprises a motor vehicle and a trailer. The motor vehicle comprises a hitch, and the trailer comprises a drawbar, which is rotatably attached to the hitch. An actual value for a hitch angle of the combination is determined by a computing unit of the combination, in particular of the motor vehicle, depending on sensor data, which is generated by a hitch angle sensor system of the combination. A hitch length of the trailer is determined by the computing unit depending on environmental sensor data generated by an environmental sensor system of the combination, in particular of the motor vehicle. Therein, the hitch length is given by a distance between a trailer body of the trailer and the hitch of the motor vehicle. A collision value for the hitch angle is determined by the computing unit depending on the hitch length. A safety measure is triggered by the computing unit depending on the actual value and the collision value.

The trailer may be designed in various ways. For example, the trailer may be designed as a boat trailer or a caravan, in particular a trailer caravan, a bicycle trailer, a utility trailer et cetera.

An environmental sensor system can be understood as a sensor system, which is able to generate sensor data or sensor signals, which depict, represent or image an environment of the sensor system. For example, cameras, lidar systems, radar systems or ultrasonic sensor systems may be considered as environmental sensor systems.

The hitch angle is defined as an angle a longitudinal axis of the motor vehicle includes with a longitudinal axis of the drawbar. Therein, the longitudinal axis of the motor vehicle is, in particular, parallel to a forward driving direction, that is a driving direction for a steering wheel angle of zero. The longitudinal direction of the drawbar corresponds to an orientation of the drawbar and, in particular, to a longitudinal direction of the trailer itself. In a situation, when the combination is driving straight forward without steering wheel angle of zero, the longitudinal directions of the motor vehicle and the drawbar or the trailer, respectively, become eventually parallel to each other, and therefore, the hitch angle becomes zero. In the following, a convention is used, wherein the hitch angle $\theta_H = \theta_v - \theta_t$. Therein, $\theta_v$ and $\theta_t$ represent the vehicle's orientation angle and the trailer's orientation angle, respectively. $\theta_v$ corresponds to an angle of the vehicle's longitudinal axis with respect to a predefined reference direction and $\theta_t$ corresponds to an angle of the drawbar's longitudinal axis with the same reference direction.

It is further assumed that the trailer is essentially symmetric such that a collision of the trailer body with the motor vehicle occurs for the same absolute value of the hitch angle for positive hitch angles and negative hitch angles. The trailer body may be understood as a component of the trailer, which faces the motor vehicle in case of zero hitch angle. In other words, when it comes to a collision between the trailer and the motor vehicle, the collision occurs at a specific point of the motor vehicle and a specific point of the trailer body, respectively.

The collision value for the hitch angle may, without loss of generality, be considered to be a positive value smaller than 180°. The collision value is therefore an approximated value for the absolute value of the hitch angle, at which the trailer body hits the motor vehicle assuming an infinite width of the trailer body. The assumption of infinite width corresponds to a worst case assumption, since it results in the smallest possible collision value. In particular, when the width of the trailer is greater than a certain threshold width, the collision value does not change, if the absolute value of the hitch angle increases further. On the other hand, in case the trailer width is smaller than the threshold width, the absolute value of the hitch angle at collision is greater than the estimated collision value. Therefore, the collision value may be universally used, independent of the actual trailer width without increasing the risk of collisions.

It is also due to this assumption or worst-case scenario that the collision value may be estimated independent of any geometrical properties of the trailer except for the hitch length. The hitch length, on the other hand, may be estimated in a convenient way by means of the environmental sensor system of the combination. For example, the hitch length may be estimated based on images of a camera system of the environmental sensor system, which is mounted on a rear end of the motor vehicle and/or by data of an ultrasonic sensor system mounted at the rear end of the motor vehicle. However, in principle also other types of environmental sensor systems may be used to estimate the hitch length, for example radar systems or lidar systems.

In particular, the environmental sensor system may comprise or comprise more than one subsystems, for example one or more cameras, one or more lidar sensor systems, one or more ultrasonic sensor systems and/or one or more radar systems.

Depending on the implementation of the environmental sensor system or its subsystems, the environmental sensor data may be of different type and ma, for example comprise one or more camera images, lidar point clouds, radar object lists and/or ultrasonic sensor datasets and/or fused sensor data.

In particular, by means of the environmental sensor data, the computing unit may directly measure a distance between the environmental sensor system and the trailer body and, based thereupon, deduce the distance between the motor vehicle and the trailer body. The distance between motor vehicle and trailer body in a situation of vanishing hitch angle, however, corresponds to the sum of the hitch length of the trailer and a hitch length of the motor vehicle, which corresponds to a distance between the hitch of the motor vehicle and the body of the motor vehicle itself. In this way, the hitch length of the trailer may be estimated, in particular, while the combination drives or stands still with a zero hitch angle.

The hitch angle sensor system may also be implemented in various ways. Any type of sensor system, which allows the computing unit to estimate or measure the hitch angle may be used. Therefore, the hitch angle sensor system may include one or more cameras, one or more radar systems et cetera. However, alternatively or in addition, the hitch angle sensor system may also comprise a sensor mounted to the hitch of the motor vehicle and configured to directly measure a rotational position of the drawbar with respect to the longitudinal direction of the motor vehicle or another reference direction.

In case the hitch angle sensor system comprises one or more cameras, one or more radar systems or another environmental sensor system, the corresponding sensor may be comprised by the hitch angle sensor system and at the same time by the environmental sensor system. In other words, the environmental sensor system and the hitch angle sensor system may share some or all of their subsystems. However, in other implementations, the hitch angle sensor system and the environmental sensor system may be separate of each other.

In a particularly efficient and cost-saving implementation, the environmental sensor system and the hitch angle sensor system comprise a common camera, in particular a rear facing camera of the motor vehicle, or consist of the camera.

The safety measure may include one or more types of safety measures. That the safety measure is be triggered depending on the actual value and the collision value may for example be understood such that it depends on the actual value and the collision value whether the safety measure is triggered or is not triggered. However, in other implementations, it may depend on the actual value and the collision value, which kind of safety measure is triggered. The safety measure may include any suitable measure, which reduces the risk of a collision between the motor vehicle and the trailer and/or reduces the risk of entering a jackknife situation.

According to the improved concept, the collision angle may therefore be estimated for the combination of the motor vehicle and the trailer based on the hitch length, which is estimated by means of the environmental sensor data. Consequently, the complexity of determining the collision value is reduced to a single measured quantity. Therefore, the improved concept allows to estimate the collision value and therefore reduces the risk of collisions, independent of the actual geometrical properties of the trailer, apart from the hitch length.

According to several implementations of the method according to the improved concept, a jackknife value for the hitch angle is determined by the computing unit, and the safety measure is triggered by the computing unit depending on the actual value, the collision value and the jackknife value.

Therein, the jackknife value corresponds to an absolute value for the hitch angle, at which the hitch angle may not be increased by further reverse driving of the combination or the motor vehicle. In other words, in case the absolute value of the hitch angle is equal to or greater than the jackknife value, the hitch angle can only be decreased and, in particular, can only be brought to zero, by forward driving of the motor vehicle.

The jackknife value may therefore also be denoted as a maximum reversible hitch angle value. In particular, the jackknife value may be greater than the collision value or equal to the collision value or smaller than the collision value, depending on properties of the trailer and the motor vehicle.

The jackknife value may for example be estimated depending on a wheelbase of the trailer, a wheelbase of the vehicle and a maximum steering angle or a maximum steering wheel angle of steerable wheels of the vehicle, in particular the front wheels of the vehicle. The wheelbase of the vehicle as well as the maximum steering angle of the vehicle may be predetermined and may, for example, be stored on a memory unit of the computing unit.

The wheelbase of the trailer, which may for example be given by a distance between the axle of the trailer and the hitch, may be estimated based on the environmental sensor data or based on further environmental sensor data. The axle of the trailer is for example the only axle of the trailer or a foremost axle of the trailer. For example, the orientation of the trailer may be tracked over some time, for example based on camera images, while the actual value of the hitch angle may also be tracked by means of the hitch angle sensor system. Based on the result of the tracking, the computing unit may deduce an estimation for the wheelbase of the trailer.

In particular, under the assumption of small enough hitch angles, for example, for hitch angles with an absolute value between zero and 50°, the jackknife value may be estimated as an expression, which only depends on the wheelbases of the trailer and the vehicle, a distance between a rear axle of the motor vehicle and the hitch as well as the maximum steering wheel angle of the vehicle. Therein, the wheelbase of the vehicle corresponds to a distance between a rear axle of the vehicle and a front axle of the vehicle, wherein the steerable wheels are mounted to the front axle. The According to several implementations, the environmental sensor data comprise at least one camera image generated by a camera system of the environmental sensor system, and the wheelbase of the trailer is determined by the computing unit depending on the at least one camera image. Alternatively, the further environmental sensor data comprise at least one camera image generated by a camera system of the further environmental sensor system, and the wheelbase of the trailer is determined by the computing unit depending on the at least one camera image.

According to several implementations, the environmental sensor data comprises ultrasonic sensor data generated by the ultrasonic sensor system of the environmental sensor system and the hitch length of the trailer is determined by the computing unit depending on the ultrasonic sensor data.

By using the ultrasonic sensor system to estimate the hitch length, costs and assembly space may be saved, in particular compared to other environmental sensor systems, such as cameras or lidar systems or radar systems.

According to several implementations, the jackknife value is determined depending on the wheelbase of the trailer.

According to several implementations, the wheelbase of the trailer is determined by the computing unit depending on the environmental sensor data or depending on further environmental sensor data generated by the environmental sensor system.

For example, the jackknife value $\theta_J$ may be estimated according to the equation:

$$\theta_J = \arctan\{[L_v * \tan(\phi v_{max}) * (L_t + L_r)] / [L_v^2 - L_t * L_r * \tan^2(\phi v_{max})]\},$$

wherein $L_v$ denotes the wheelbase of the vehicle, $L_t$ denotes the wheelbase of the trailer, $L_r$ denotes the distance between the vehicle's rear axle and the hitch and $\psi v_{max}$ denotes the maximum steering wheel angle of the vehicle.

The collision angle $\theta_C$ may, for example, be estimated according to the equation:

$$\theta_C = \arcsin[(H_t - D)/h] + \arcsin(H_v/h),$$

wherein $H_t$ than denotes the hitch length of the trailer, h denotes a predefined distance between a potential point of collision of the motor vehicle and the hitch. The potential point of collision may for example correspond to an outermost point on the vehicle body in a lateral direction of the vehicle. D denotes a predefined buffer parameter, which may be equal to or greater than zero.

According to several implementations, a first critical value for the hitch angle is determined by the computing unit depending on a minimum of the collision value and the jackknife value. A first safety measure is triggered by the computing unit depending on a result of a comparison of the actual value for the hitch angle to the first critical value. In other words, the safety measure comprises the first safety measure.

In particular, the first safety measure may be triggered, if the actual value for the hitch angle is equal to or greater than the first critical value, in particular, if and only if the actual value is equal to or greater than the first critical value.

Considering the minimum of the collision value and the jackknife value, collisions as well as jackknife situations are both avoided independent of whether the jackknife value is greater than the collision value or vice versa.

According to several implementations, the first safety measure includes generating a warning message for a user of the motor vehicle, in particular for a driver of the motor vehicle. The warning message may include one or more visual or optical, acoustic and/or or haptic signals or messages.

According to several implementations, the first safety measure includes carrying out an automatic braking maneuver of the motor vehicle According to several implementations, a second critical value for the hitch angle is determined by the computing unit depending on the minimum of the collision value and the jackknife value, for example as the minimum of the collision value and the jackknife value, wherein an absolute value of the second critical value is greater than an absolute value of the first critical value. A second safety measure is triggered by the computing unit depending on a result of the comparison of the actual value for the hitch angle to the second critical value by the computing unit. In other words, the safety measure comprises the second safety measure.

In such implementations, the first critical value may for example correspond to a sum of the minimum of the collision value and the jackknife value and a predefined buffer value, and the second critical value may correspond to the minimum of the collision value and the jackknife value.

Then, the first safety measure may be triggered, if the actual value for the hitch angle is equal to or greater than the first critical value and, in particular, only if the actual value is smaller than the second critical value. On the other hand, the second safety measure may be triggered, if the actual value of the hitch angle is equal to or greater than the second critical value, for example if and only if the actual value is equal to or greater than the second critical value.

In some implementations, the actual value may be compared to the second critical value, only if the comparison of the actual value to the first critical value reveals that the actual value is equal to or greater than the first critical value. Otherwise, it may make no sense to carry out the comparison of the hitch angle to the second critical value, since the second critical value is in any case greater than the first critical value.

According to several implementations, the second safety measure includes carrying out an automatic braking maneuver of the motor vehicle.

In particular, the computing unit may generate one or more commands or one or more control signals for respective actuators or control units of the motor vehicle in order to trigger the second safety measure and, in particular, the automatic braking maneuver.

In some implementations, the safety measure may include the first safety measure and/or the second safety measure. The first safety measure may include generating the warning message and the second safety measure may include carrying out the automatic braking maneuver.

In this way, a graduated escalation may be achieved by triggering the warning message when the hitch angle approaches the minimum of the collision value and the jackknife angle but has not reached the minimum, yet. When the actual value has actually reached the minimum, the braking maneuver is carried out to avoid collisions or entering the jackknife situation. Therefore, the risk of collisions and/or jackknife situations may be reduced while the user comfort remains high.

According to the improved concept, also a driver assistance system for assisting reverse driving of a combination, in particular an advanced driver assistance system, ADAS, is provided. The combination comprises a motor vehicle with a hitch and a trailer with a drawbar, which is rotatably attached to the hitch. The driver assistance system comprises a hitch angle sensor system, which is configured to generate sensor data, and a computing unit, which is configured to determine an actual value of a hitch angle of the combination depending on the sensor data. The driver assistance system comprises an environmental sensor system, which is configured to generate environmental sensor data. The computing unit is configured to determine a hitch length of the trailer given by a distance between a trailer body of the trailer and the hitch depending on the environmental sensor data. The computing unit is configured to determine a collision value for the hitch angle depending on the hitch length and trigger a safety measure depending on the actual value and the collision value.

Further implementations of the driver assistance system according to the improved concept follow directly from the various implementations of the method according to the improved concept and vice versa.

In particular, a driver assistance system according to the improved concept may be configured to carry out a method according to the improved concept or carries out such a method.

According to the improved concept, also a motor vehicle comprising a driver assistance system according to the improved concept is provided.

In particular, all components of the driver assistance system, in particular the hitch angle sensor system, the environmental sensor system and the computing unit, are comprises by the motor vehicle.

According to the improved concept, also a combination comprising a motor vehicle with a hitch and a trailer with a drawbar is provided. The drawbar is rotatably attached to the hitch. The combination comprises a driver assistance system according to the improved concept.

In a combination according to the improved concept, the motor vehicle may comprise the driver assistance system. However, at least some components of the driver assistance system may also be comprised by the trailer, for example, the hitch angle sensor system or at least a part of the environmental sensor system.

According to the improved concept, also a computer program comprising instructions is provided. When the instructions or the computer program, respectively, is carried out by a driver assistance system according to the improved concept, in particular, by the computing unit of the driver assistance system, the instructions cause the driver assistance system to carry out a method according to the improved concept.

According to the improved concept, also a computer-readable storage medium storing a computer program according to the improved concept is provided.

Further features of the invention are apparent from the claims, the figures and the description of figures. The features and feature combinations mentioned above in the description as well as the features and feature combinations mentioned below in the description of figures and/or shown in the figures alone may not only be encompassed by the improved concept in the respectively specified combination, but also in other combinations. Thus, implementations of the improved concept are encompassed and disclosed, which may not explicitly be shown in the figures or explained, but arise from and can be generated by separated feature combinations from the explained implementations. Implementations and feature combinations, which do not have all features of an originally formulated claim, may be encompassed by the improved concept. Moreover, implementations and feature combinations, which extend beyond or deviate from the feature combinations set out in the relations of the claims, may be encompassed by the improved concept.

Figure 1:
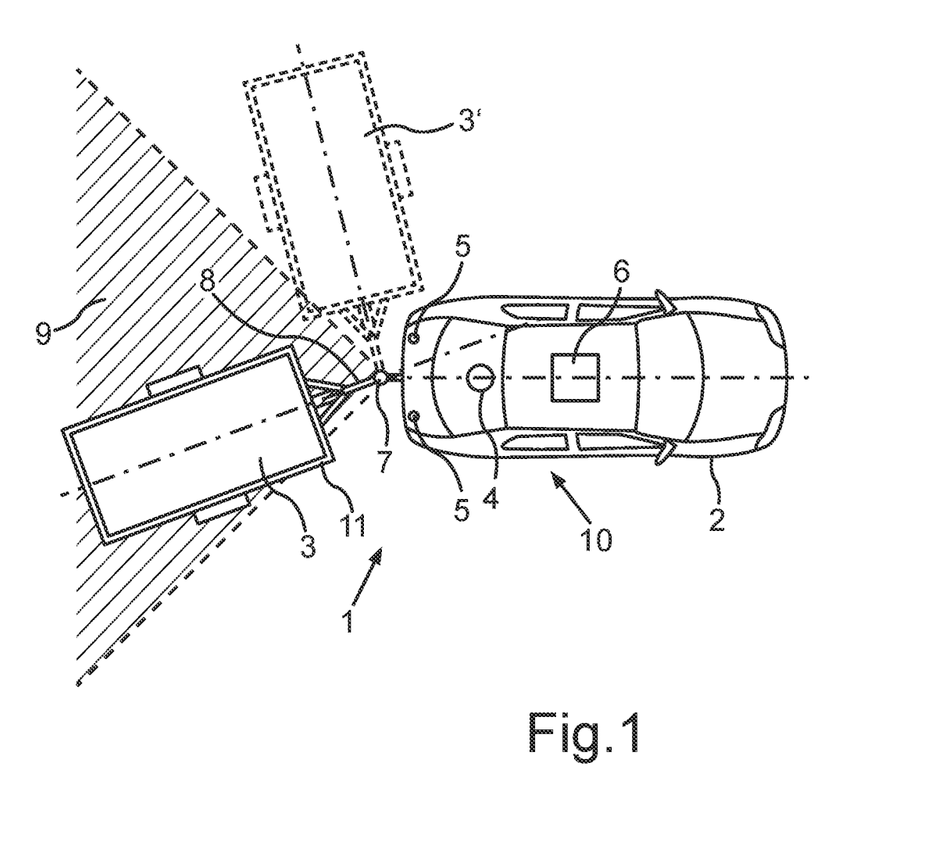
FIG. 1 shows schematically a motor vehicle with an exemplary implementation of a driver assistance system according to the improved concept.

FIG. 1 shows schematically a combination 1 with a motor vehicle 2 and a trailer 3, which is connected to a hitch 7 of the motor vehicle 2 via a drawbar 8 of the trailer 3. The combination 1, in particular the motor vehicle 2, comprises an exemplary implementation of a driver assistance system 10 according to the improved concept for assisting reverse driving of the combination 1. The driver assistance system 10 comprises a hitch angle sensor system, which is configured to generate sensor data and a computing unit 6, which is configured to determine an actual value of the hitch angle $\theta_H$ of the combination 1 depending on the sensor data.

In some implementations, the hitch angle sensor system comprises a camera 4, in particular a rear facing camera of the motor vehicle 2, which is able to depict at least a part of the trailer 3 and/or the drawbar 8. Alternatively or in addition, a rotation angle sensor may be implemented in the hitch 7 or the drawbar 8 to determine the hitch angle $\theta_H$. The hitch angle $\theta_H$ corresponds to an angle, a longitudinal axis of the motor vehicle 1 includes with a longitudinal axis of the trailer 3, in particular the drawbar 8, as depicted schematically in FIG. 3.

In case of a reverse driving situation, the absolute value of the hitch angle $\theta_H$ may always be decreased or brought to zero, as long as the hitch angle $\theta_H$ is within a reversible angle region 9 indicated in FIG. 1. The reversible angle region 9 is limited by a jackknife value $\theta_J$ for the hitch angle $\theta_H$. In particular, if the absolute value of the hitch angle $\theta_H$ is greater than the jackknife value $\theta_J$, the absolute value of the hitch angle $\theta_H$ cannot be decreased by reverse driving anymore but the combination 1 has to be driven in forward direction.

Furthermore, if the absolute value of the hitch angle $\theta_H$ assumes a collision value $\theta_C$, a collision between the trailer 3 and the motor vehicle 1 may occur. In FIG. 1, the trailer 3 is indicated at a different position 3', where the hitch angle $\theta_H$ is close to the collision value $\theta_C$.

The driver assistance system 10 and the corresponding method for assisting reverse driving of the combination 1 according to the improved concept may help to avoid collisions as well as jackknife situations, where the hitch angle $\theta_H$ is outside of the reversible angle region 9. It is noted, however, that the collision value $\theta_C$ is not necessarily greater than the jackknife value $\theta_C$, even though this is the case in the schematic representation of FIG. 1. It depends on the geometry of the motor vehicle 2, the trailer 3 and, in particular, position of the hitch 7 positioned as well as the length of the drawbar 8.

The driver assistance system 10 comprises an environmental sensor system, which may contain the camera 4 and/or one or more ultrasonic sensors 5 mounted at a rear part of the motor vehicle 2 such that it may detect or measure a distance between the trailer 3 and the motor vehicle 2. The computing unit 6 is configured to determine a hitch length $H_t$ of the trailer 3 given by a distance between a trailer body 11 and the hitch 7 depending on environmental sensor data generated by the environmental sensor system, in particular depending on camera images generated by the camera 4 and/or ultrasonic sensor data generated by the ultrasonic sensors 5. The hitch length $H_t$ may for example correspond to a length of the drawbar 8.

The computing unit 6 may determine the collision value $\theta_C$ depending on the hitch length $H_t$ and trigger a safety measure depending on the actual value of the hitch angle $\theta_H$ and the collision value $\theta_C$. Optionally, the computing unit 6 may also determine the jackknife value $\theta_J$ and trigger the safety measure or a further safety measure depending on the actual value of the hitch angle $\theta_H$ and the jackknife value $\theta_J$.

Figure 2:
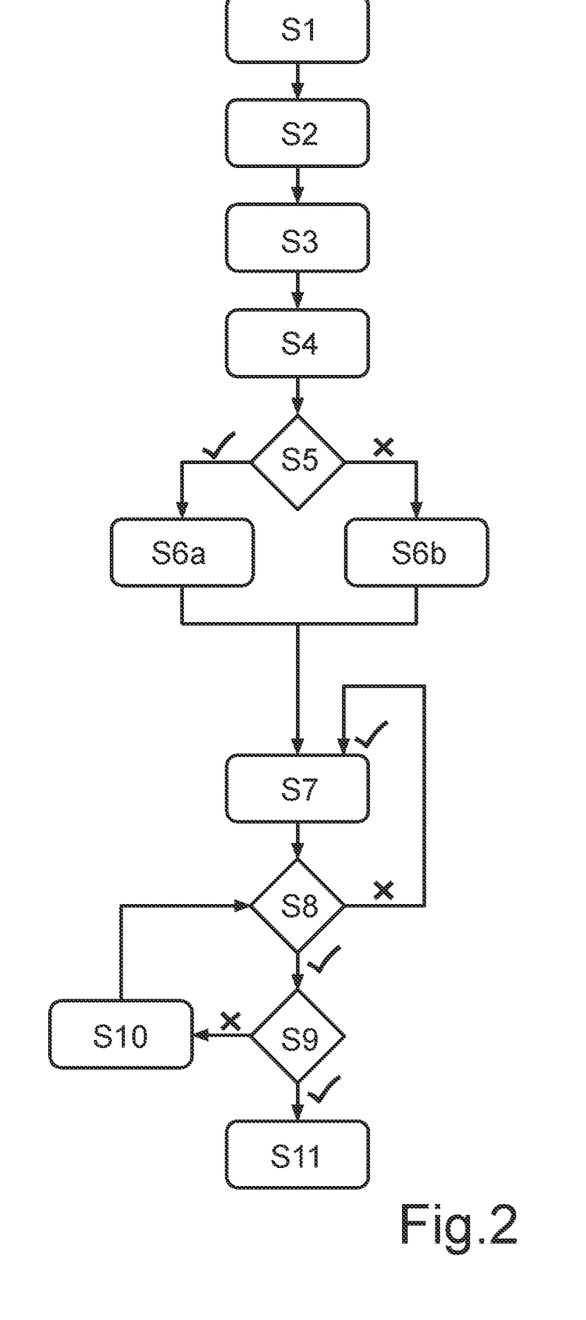
FIG. 2 shows a flow diagram of an exemplary implementation of a method according to an improved concept.

An exemplary flow diagram for a method for assisting reverse driving of the combination 1 by means of the driver assistance system 10 according to the improved concept is shown in FIG. 2.

Figure 3:
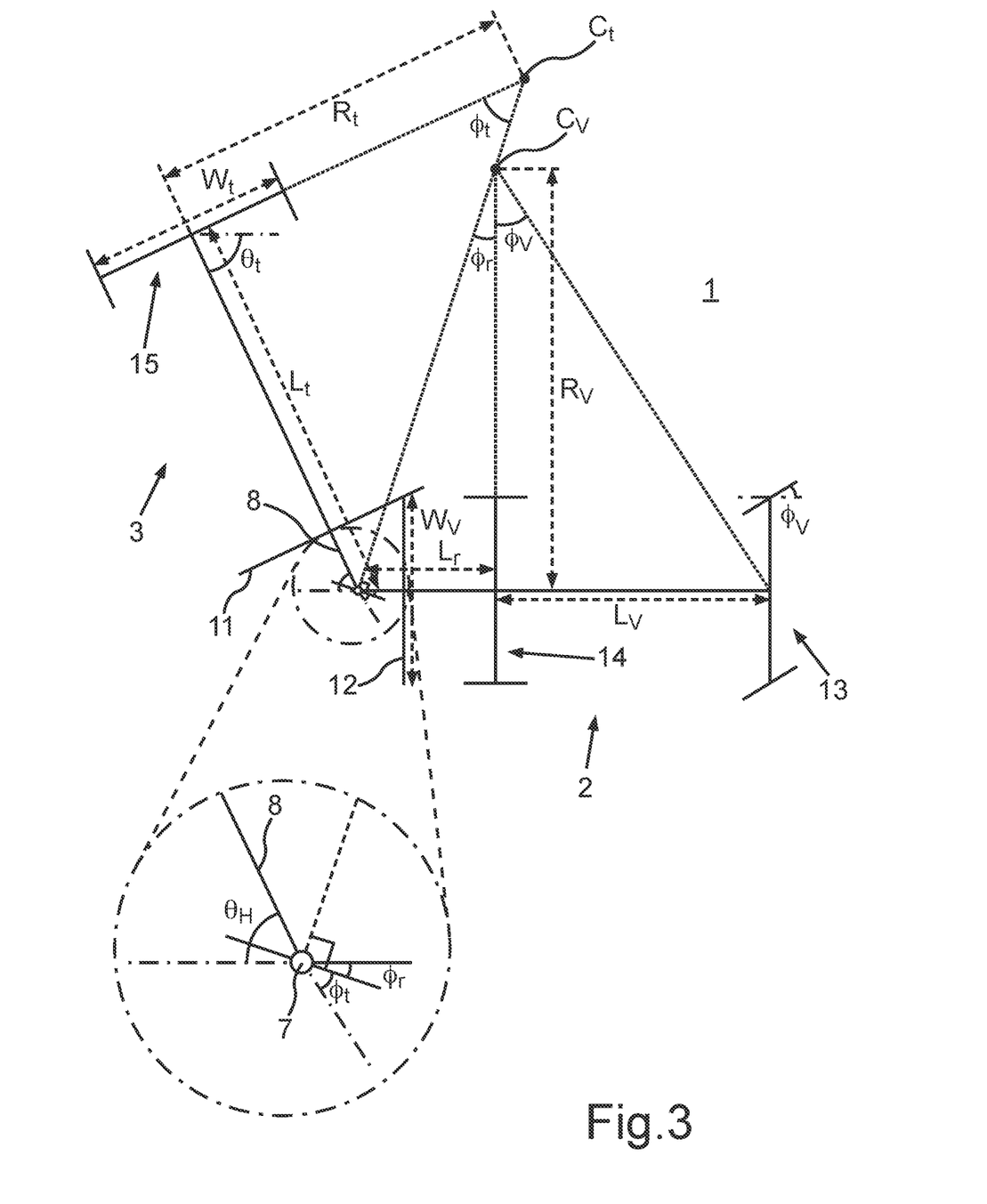
FIG. 3 shows a schematic representation of a combination with a motor vehicle and a trailer.
Figure 4:
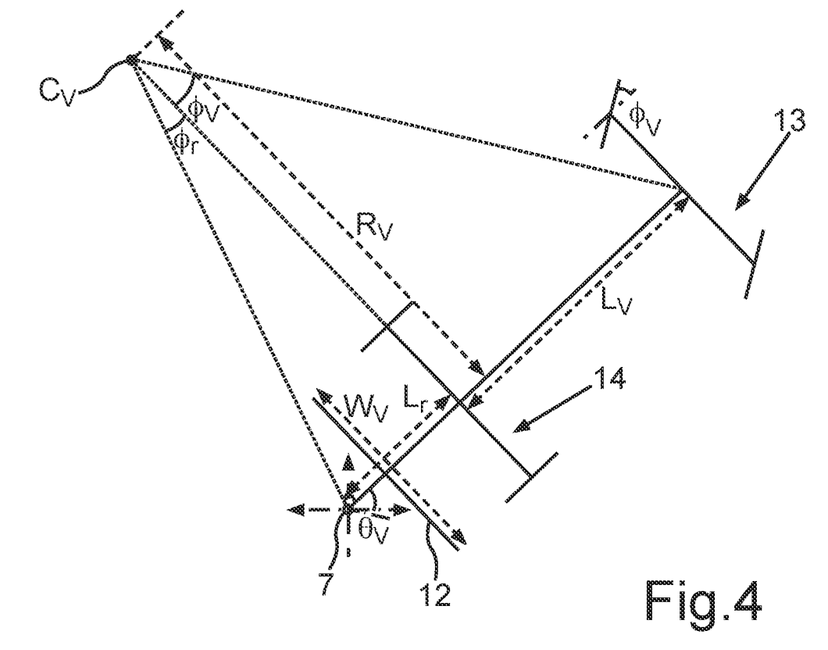
FIG. 4 shows a schematic representation of a motor vehicle.

In step S1, the computing unit 6 determines a wheelbase $L_t$ of the trailer. The wheelbase $L_t$ is given by the distance between the hitch 7 and the axle 15, in particular the front axle, of the trailer 3 as shown in FIG. 3. The wheelbase $L_t$ of the trailer 3 may for example be determined depending on camera images of the camera 4. For example, the computing unit 6 may track the movement of the trailer 3 depending on the camera image and deduce the wheelbase $L_t$ of the trailer 3 from the orientation of the trailer 3 and the corresponding course of the hitch angle $\theta_H$.

Figure 6:
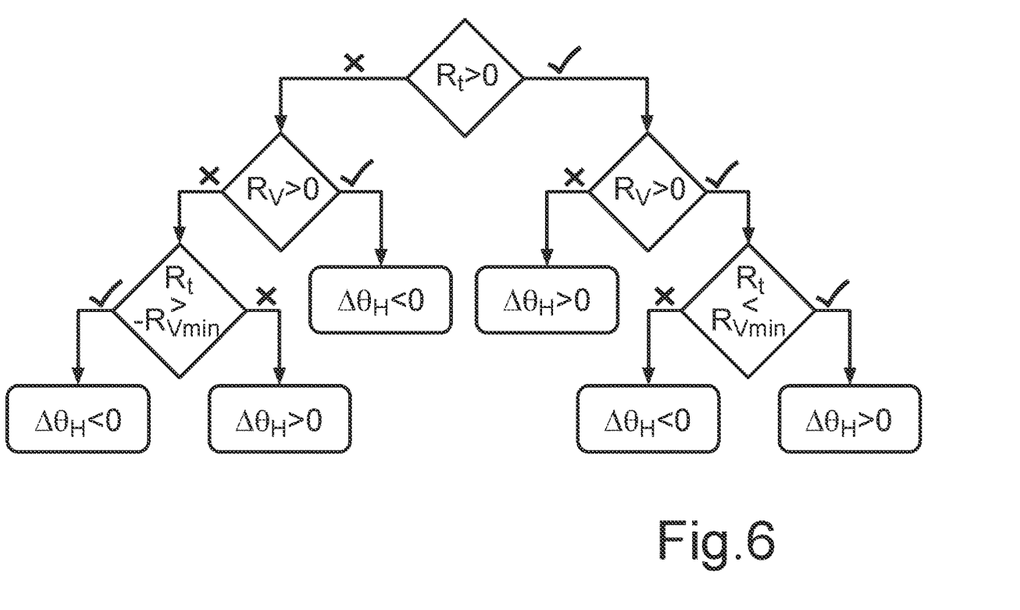
FIG. 6 shows a decision tree regarding the sign of a hitch angle change.
Figure 7:
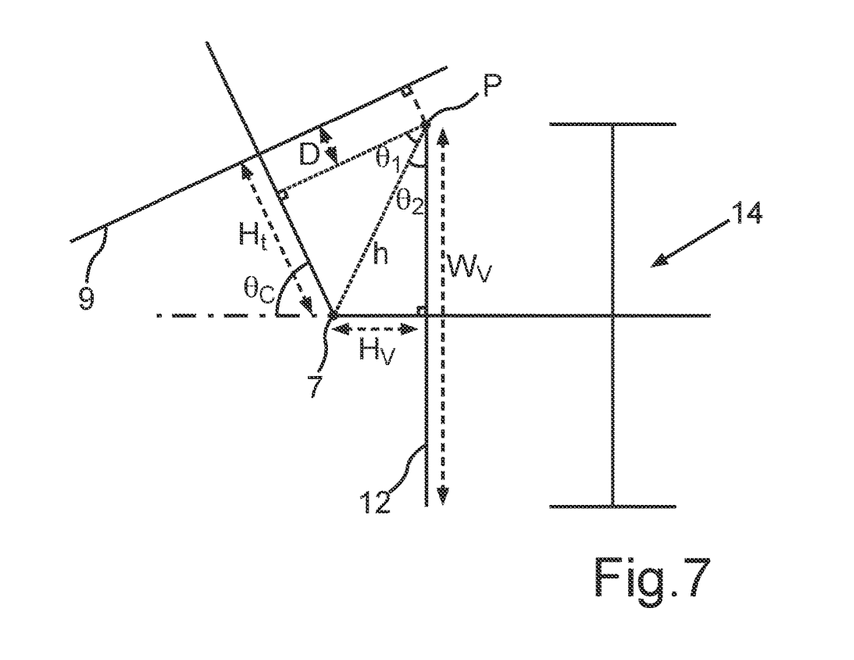
FIG. 7 shows a further schematic representation of a combination with a motor vehicle and a trailer.

In step S2, the computing unit 6 computes the jackknife value $\theta_J$ depending on the wheelbase $L_t$ of the trailer 3. More details about the calculation of the jackknife value $\theta_J$ are provided below with reference to FIG. 3 to FIG. 6. In step S3, the computing unit 6 may determine the distance between the vehicle 2 and the trailer body 11, for example, depending on the ultrasonic sensor data or the camera images. In step S4, the computing unit calculates the hitch length $H_t$ depending on the measured distance of S3. For example, the computing unit 6 may compute the hitch length $H_t$ as a difference between the measured distance and the predefined hitch length $H_v$ of the vehicle 2, which is given by a distance between the body 12 of the vehicle 2 and the hitch 7, as indicated in FIG. 7. Then, the computing unit 6 may compute the collision value $\theta_C$ depending on the hitch length $H_t$ of the trailer 3. More details about the calculation of the collision value $\theta_C$ are provided below with reference to FIG. 7.

In step S5, the computing unit may for example compare the collision value $\theta_C$ to the jackknife value $\theta_J$. In case the collision value $\theta_C$ is greater than the jackknife value $\theta_J$, a first critical value for the hitch angle is determined in step S6a as $\theta_J$–B, wherein B denotes a positive buffer value. Furthermore, a second critical value for the hitch angle $\theta_H$ is defined as the jackknife value $\theta_J$. If, on the other hand, the collision value $\theta_C$ is smaller than the jackknife value $\theta_J$, the computing unit 6 defines the first critical value in step S6b as $\theta_C$–B and the second critical value as the collision value $\theta_C$.

The steps S1 to S6a or S6b are, for example, carried out once for a given combination 1. In case the combination 1 changes, for example if a different trailer 3 is attached to the motor vehicle 2, steps S1 to S6a or S6b may be repeated.

In step S7, the computing unit 6 obtains a value of the hitch angle $\theta_H$ depending on the sensor data generated by the hitch angle sensor system. In step S8, the computing unit 6 compares the value of the hitch angle $\theta_H$ to the first critical value. In case the absolute value of the hitch angle $\theta_H$ is smaller than the first critical value, step S7 is repeated and so forth. However, if it is found in S8 that the absolute value of the hitch angle $\theta_H$ is equal to or greater than the first critical value, it is determined by the computing unit 6 in step S9 whether the absolute value of the hitch angle $\theta_H$ is also equal to or greater than the second critical value. If this is not the case, that is the absolute value of the hitch angle $\theta_H$ is equal to or greater than the first critical value but smaller than the second critical value, a first safety measure is triggered in step S10.

The first safety measure may for example include a warning, for example a visual, acoustic or haptic warning, to the driver of the motor vehicle 2 indicating that the hitch angle $\theta_H$ approaches the boarders of the reversible angle region 9 or the trailer 3 is about to collide with the vehicle 2. Then, step S8 is repeated. However, if it is found in S9 that the absolute value of the hitch angle $\theta_H$ is already greater than or equal to the second critical value, a second safety measure is triggered by the computing unit 6 in step S11. The second safety measure may, in particular, include an emergency braking maneuver, which may automatically be carried out by a braking system of the motor vehicle 1 triggered by the computing unit 6.

In this way, it is avoided that the vehicle 2 and the trailer 3 collide with each other and also that the hitch angle $\theta_H$ leaves the reversible angle region 9 and a jackknife situation is entered.

In FIG. 3, the combination 1 is shown schematically in more detail, wherein the motor vehicle 2 is represented by a front axle 13 with steerable wheels and the rear axle 14 with non-steerable wheels. The trailer 3 comprises a single axle 15 and the drawbar 8, and the trailer body 11 is indicated by a straight line. Furthermore, also the vehicle body 12 is indicated by a straight line.

The hitch angle $\theta_H$ is given by $\theta_v - \theta_t$, wherein $\theta_v$ denotes the orientation of the vehicle 2 with respect to predefined reference direction, for example the horizontal direction in FIG. 3, and $\theta_t$ denotes the corresponding trailer orientation with respect to the same reference direction. A change in the hitch angle $\Delta\theta_H$ is given by $$\Delta\theta_H = \Delta\theta_v - \Delta\theta_t = \Delta S(1/R_v - 1/R_t), \quad (1')$$

wherein $\Delta S$ is always negative for backward motion, such that $$\Delta\theta_H = \Delta\theta_v - \Delta\theta_t = |\Delta S|(1/R_t - 1/R_v). \quad (1)$$

Therein, $R_t$ denotes radius of rotation of the trailer 3 around the instantaneous center of rotation $C_t$ of the trailer 3, as depicted in FIG. 3. $R_v$ denotes the instantaneous radius of rotation of the vehicle 2 around the instantaneous center of rotation $C_v$ of the vehicle 2, as depicted in FIG. 3. FIG. 6 shows the relation between the respective signs of $R_t$ and $R_v$ and the value of R with respect to $R_{V_{min}}$ on the one hand and the sign of the change of the hitch angle $\Delta\theta_H$ on the other hand.

Figure 5:
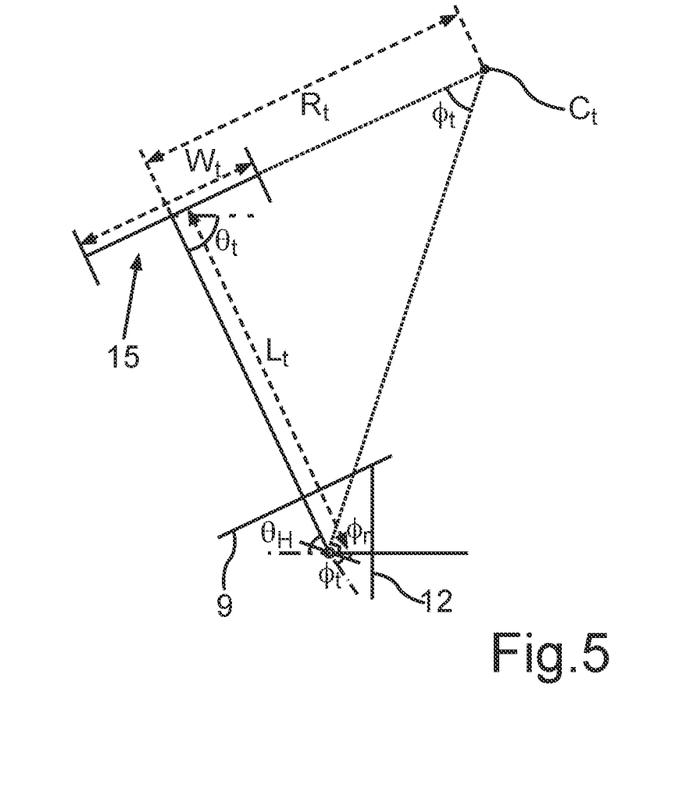
FIG. 5 shows a schematic representation of a trailer.

Therefore, from equation (1) and FIG. 6 it follows that $\Delta\theta_H$ has always the same sign as $R_t$. Consequently, it may be assumed that a jackknife situation occurs only when $R_t$ is equal to or smaller than $R_{Vmin}$, which means that the instantaneous radius of rotation of the trailer 3 smaller than the one of the vehicle 2. At this condition, if the backward motion is continued, the jackknife effect progressively worsens until eventually physical contact occurs. In order to determine the jackknife value $\theta_J$, R is set equal to $R_{Vmin}$, which is given by $R_{Vmin}=L_v/\tan(\phi v_{max})$, wherein $\phi v_{max}$ denotes the maximum wheel angle of the steerable wheels of the vehicle 2. Therefore, with $\tan(\phi_t)=L_t/R_t$ and $\phi_r=\phi_t-\theta_J$, it follows that $$R_t==L_t/\tan(\phi_t)=L_v/\tan(\phi v_{max}), \qquad (2)$$

$$\tan(\phi_t)=\tan(\theta_J+\phi_r)=[\tan(\theta_J)+\tan(\phi_r)]/[1-\tan(\theta_J)*\tan(\phi_r)]=L_t*\tan(\phi v_{max})/L_v, \qquad (3)$$

$$L_v*[\tan(\theta_J)*\tan(\phi_r)]=L_t*\tan(\phi v_{max})*[1-\tan(\theta_J)*\tan(\phi_r)], \qquad (4)$$

$$\tan(\theta_J)=[L_t*\tan(\phi v_{max})-L_v*\tan(\phi_r)]/[L_v+L_t*\tan(\phi v_{max})*\tan(\phi_r)], \qquad (5)$$

and further, in view of FIG. 5

$$\tan(\phi_r)=-L_r*\tan(\phi v_{max})/L_v. \qquad (6)$$

Substituting equation (6) in equation (5) yields $$\tan(\theta_J)=[L_v*\tan(\phi v_{max})(L_t+L_r)]/[L_v^2-L_t*L_r*\tan^2(\phi v_{max})], \text{ and} \qquad (7)$$

$$\theta_J=\arctan\{[L_v*\tan(\phi v_{max})*(L_t+L_r)]/[L_v^2-L_t*L_r*\tan^2(\phi v_{max})]\}. \qquad (8)$$

For determining the collision value $\theta_C$, it may for example be assumed that the collision always occurs at a corner of a bumper of the vehicle 2 bumper, and therefore the point of contact P always lies on the vehicle's contour corner and somewhere along the lateral width of the trailer 3. The width of the trailer 3 is not necessarily known. Therefore, a worst-case scenario for the collision is assumed, where the width of the trailer 3 is assumed to be equal to the width $W_v$ of the vehicle 2. In case the actual width of the trailer 3 is greater than the width of the vehicle 2, the collision will occur at the same value of the hitch angle $\theta_H$ as for the width of the trailer 3 being equal to $W_v$. If, on the other hand, the width of the trailer 3 is smaller than the width $W_v$ of the vehicle 2, the collision would occur at greater absolute value for the hitch angle $\theta_H$ than estimated in the following for the collision value $\theta_C$.

Therefore it follows that $$\theta_C=\arcsin[(H_t-D)/h]+\arcsin(H_v/h). \qquad (9)$$

As described, in particular with respect to the figures, the improved concept allows to assisting reverse driving of a combination universally for different trailers with different geometries or outlines. To this end, a hitch length of the trailer is estimated by means of an environmental sensor system and the collision value is determined depending on the hitch length.

The invention claimed is:

1. A method for assisting reverse driving of a combination, the combination comprising a motor vehicle with a hitch and a trailer with a drawbar rotatably attached to the hitch, the method comprising:
    determining an actual value for a hitch angle of the combination by a computing unit of the combination depending on sensor data generated by a hitch angle sensor system of the combination;
    determining a hitch length of the trailer, which is given by a distance between a trailer body of the trailer and the hitch, by the computing unit depending on environmental sensor data generated by an environmental sensor system of the combination;
    determining a collision value for the hitch angle by the computing unit depending on the hitch length and a predefined distance between a collision point of the hitch and a collision point of the motor vehicle;
    determining a jackknife value for the hitch angle by the computing unit; and
    determining a first critical value and a second critical value by the computing unit depending on a minimum of the collision value and the jackknife value, wherein an absolute value of the second critical value is greater than an absolute value of the first critical value,
    wherein the collision point of the motor vehicle corresponds to an outermost point on a body of the motor vehicle in a lateral direction of the motor vehicle; and
    triggering safety measures by the computing unit depending on the actual value, the collision value and the jackknife value, wherein:
    a first safety measure is triggered depending on a result of a comparison of the actual value to the first critical value by the computing unit; and
    a second safety measure is triggered depending on a result of a comparison of the actual value to the second critical value by the computing,
    wherein the safety measures include carrying out an automatic braking maneuver of the motor vehicle.

2. The method according to claim 1, wherein the first safety measure includes generating a warning message for a user of the motor vehicle.

3. The method according to claim 1, wherein the jackknife value is determined depending on a wheelbase of the trailer.

4. The method according to claim 3, wherein the wheelbase is determined by the computing unit depending on the environmental sensor data or depending on further environmental sensor data generated by the environmental sensor system.

5. The method according to claim 2, wherein:
    the environmental sensor data comprise at least one camera image generated by a camera system of the environmental sensor system and the wheelbase is determined by the computing unit depending on the at least one camera image, or
    the further environmental sensor data comprises at least one camera image generated by a camera system of the further environmental sensor system and the wheelbase is determined by the computing unit depending on the at least one camera image.

6. The method according to claim 1, wherein the environmental sensor data comprises ultrasonic sensor data generated by an ultrasonic sensor system of the environmental sensor system and the hitch length of the trailer is determined by the computing unit depending on the ultrasonic sensor data.

7. The method according to claim 1, wherein:
    the computing unit defines the second critical value as the jackknife value or the collision value, and
    the first critical value differs from the second critical value by a positive buffer value.

8. The method according to claim 7, wherein:
    the computing unit defines the second critical value as the jackknife value, if the collision value is greater than the jackknife value, and
    the computing unit defines the second critical value as the collision value, if the collision value is smaller than the jackknife value.

9. A driver assistance system for assisting reverse driving of a combination, wherein the combination comprises a motor vehicle with a hitch and a trailer with a drawbar rotatably attached to the hitch, the driver assistance system comprising:
- a hitch angle sensor system, which is configured to generate sensor data;
- a computing unit, which is configured to determine an actual value for a hitch angle of the combination depending on the sensor data; and
- an environmental sensor system configured to generate environmental sensor data wherein the computing unit is configured to:
- determine a hitch length of the trailer given by a distance between a trailer body of the trailer and the hitch depending on the environmental sensor data,
- determine a collision value for the hitch angle depending on the hitch length and a predefined distance between a collision point of the hitch and a collision point of the motor vehicle,
- determine a jackknife value for the hitch angle by the computing unit; and
- determine a first critical value and a second critical value by the computing unit depending on a minimum of the collision value and the jackknife value,
- wherein an absolute value of the second critical value is greater than an absolute value of the first critical value,
- wherein the collision point of the motor vehicle corresponds to an outermost point on a body of the motor vehicle in a lateral direction of the motor vehicle, and
- trigger safety measures depending on the actual value, the collision value and the jackknife value, wherein:
- a first safety measure is triggered depending on a result of a comparison of the actual value to the first critical value by the computing unit; and
- a second safety measure is triggered depending on a result of a comparison of the actual value to the second critical value by the computing unit,
- wherein the safety measures include carrying out an automatic braking maneuver of the motor vehicle.

10. A motor vehicle comprising a driver assistance system according to claim 9.

11. A combination comprising a motor vehicle with a hitch, a trailer with a drawbar rotatably attached to the hitch, and a driver assistance system according to claim 9.

12. A non-transitory computer-readable storage medium storing a computer program comprising instructions, which, when carried out by a driver assistance system according to claim 9, cause the driver assistance system to carry out a method comprising:
- determining an actual value for a hitch angle of the combination by a computing unit of the combination depending on sensor data generated by a hitch angle sensor system of the combination,
- determining a hitch length of the trailer, which is given by a distance between a trailer body of the trailer and the hitch, by the computing unit depending on environmental sensor data generated by an environmental sensor system of the combination,
- determining a collision value for the hitch angle by the computing unit depending on the hitch length, and
- triggering a safety measure by the computing unit depending on the actual value and the collision value.

13. The driver assistance system according to claim 9, wherein:
- the computing unit defines the second critical value as the jackknife value or the collision value, and
- the first critical value differs from the second critical value by a positive buffer value.

14. The driver assistance system according to claim 9, wherein:
- the computing unit defines the second critical value as the jackknife value, if the collision value is greater than the jackknife value, and
- the computing unit defines the second critical value as the collision value, if the collision value is smaller than the jackknife value.

* * * * *